United States Patent
Kim et al.

(10) Patent No.: US 12,461,338 B2
(45) Date of Patent: Nov. 4, 2025

(54) IMAGING LENS SYSTEM

(71) Applicant: Samsung Electro-Mechanics Co., Ltd., Suwon-si (KR)

(72) Inventors: Hyuk Joo Kim, Suwon-si (KR); Kyu Min Chae, Suwon-si (KR); Seong Ho Hwang, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 456 days.

(21) Appl. No.: 17/016,820

(22) Filed: Sep. 10, 2020

(65) Prior Publication Data

US 2021/0181463 A1 Jun. 17, 2021

(30) Foreign Application Priority Data

Dec. 17, 2019 (KR) .......................... 10-2019-0168991

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC ... G02B 9/02; G02B 9/62; G02B 9/64; G02B 13/18; G02B 13/06; G02B 13/0045; G02B 15/146; G02B 27/0025; H04N 5/2254; H04N 5/222
USPC ......... 359/756–762, 749, 713, 708, 656–658
See application file for complete search history.

(56) References Cited

U.S. PATENT DOCUMENTS

| | | | | |
|---|---|---|---|---|
| 6,014,265 A | * | 1/2000 | Kato | G02B 15/144107 359/686 |
| 9,291,805 B1 | * | 3/2016 | Lin | G02B 15/143507 |
| 9,465,201 B2 | | 10/2016 | Kitahara | |
| 10,131,278 B2 | | 11/2018 | Nagano | |
| 10,185,126 B2 | | 1/2019 | Kim et al. | |
| 10,705,322 B2 | | 7/2020 | Jia et al. | |
| 10,983,308 B2 | | 4/2021 | Emi | |
| 2003/0184876 A1 | * | 10/2003 | Tomioka | G02B 15/177 359/691 |
| 2005/0190457 A1 | * | 9/2005 | Ohashi | G02B 15/144113 359/687 |

(Continued)

FOREIGN PATENT DOCUMENTS

| CN | 204302561 U | 4/2015 |
|---|---|---|
| CN | 105974561 A | 9/2016 |

(Continued)

OTHER PUBLICATIONS

Ohara data sheet for S-LAH58 material (Year: 2023).*

(Continued)

*Primary Examiner* — Travis S Fissel
(74) *Attorney, Agent, or Firm* — NSIP Law

(57) ABSTRACT

An imaging lens system includes a first lens, a second lens, a third lens having negative refractive power, a fourth lens, a fifth lens, and a sixth lens, disposed in order from an object side in a direction of an imaging plane, wherein one or more of the first to sixth lenses has a refractive index of 1.8 or greater, and has a refractive index temperature coefficient ($10^{-6}/°$ C.) of 3 or greater.

6 Claims, 6 Drawing Sheets

(56) References Cited

U.S. PATENT DOCUMENTS

| | | | |
|---|---|---|---|
| 2005/0200968 A1* | 9/2005 | Nose | G02B 15/177 |
| | | | 359/680 |
| 2015/0168692 A1 | 6/2015 | Kitahara | |
| 2015/0168693 A1* | 6/2015 | Sun | G02B 13/04 |
| | | | 359/751 |
| 2015/0205070 A1* | 7/2015 | Lee | G02B 13/0045 |
| | | | 359/713 |
| 2016/0170180 A1* | 6/2016 | Son | G02B 13/0045 |
| | | | 359/708 |
| 2017/0293110 A1 | 10/2017 | Kim et al. | |
| 2018/0039049 A1* | 2/2018 | Lee | G02B 13/06 |
| 2018/0074300 A1* | 3/2018 | Gyoda | G02B 15/177 |
| 2018/0095245 A1* | 4/2018 | Kanzaki | G02B 9/64 |
| 2018/0157007 A1 | 6/2018 | Kim et al. | |
| 2018/0213151 A1 | 7/2018 | Joujiki et al. | |
| 2019/0094495 A1 | 3/2019 | Amano et al. | |
| 2019/0179117 A1 | 6/2019 | Kim et al. | |
| 2019/0187443 A1 | 6/2019 | Jia et al. | |
| 2019/0293907 A1 | 9/2019 | Emi | |
| 2020/0049960 A1 | 2/2020 | Otsu | |
| 2021/0072509 A1 | 3/2021 | Chae et al. | |
| 2021/0333510 A1 | 10/2021 | Wei et al. | |

FOREIGN PATENT DOCUMENTS

| | | | |
|---|---|---|---|
| CN | 106990509 A | | 7/2017 |
| CN | 107272142 A | | 10/2017 |
| CN | 207074298 U | | 3/2018 |
| CN | 109521549 A | | 3/2019 |
| CN | 109791272 A | | 5/2019 |
| CN | 110007425 A | | 7/2019 |
| CN | 110412752 A | | 11/2019 |
| JP | 2012141464 A | * | 7/2012 |
| JP | 2015-118152 A | | 6/2015 |
| JP | 2016-142883 A | | 8/2016 |
| JP | 2018-120124 A | | 8/2018 |
| JP | 2019-60972 A | | 4/2019 |
| KR | 10-2018-0064179 A | | 6/2018 |
| KR | 10-2021-0030007 A | | 3/2021 |
| WO | WO 2019/234800 A1 | | 12/2019 |

OTHER PUBLICATIONS

CN107450155 and Translation (Year: 2017).*
Korean Office Action issued on Jun. 8, 2021 in counterpart Korean Patent Application No. 10-2019-0168991 (12 pages in English; 7 pages in Korean).
Chinese Office Action issued on Jan. 6, 2022, in counterpart Chinese Patent Application No. 202011285315.7 (6 pages in English and 6 pages in Chinese).
Korean Office Action issued on May 2, 2023, in counterpart Korean Patent Application No. 10-2022-0054261 (6 pages in English, 4 pages in Korean).
Chinese Office Action Issued on Jan. 11, 2025, in Counterpart Chinese Patent Application No. 202211114613.9 (5 Pages in English, 8 Pages in Chinese).
Chinese Office Action Issued on Jan. 13, 2025, in Counterpart Chinese Patent Application No. 202211113893.1 (5 Pages in English, 8 Pages in Chinese).

* cited by examiner

IMAGING LENS SYSTEM

CROSS-REFERENCE TO RELATED APPLICATION(S)

This application claims the benefit under 35 USC 119(a) of Korean Patent Application No. 10-2019-0168991 filed on Dec. 17, 2019 in the Korean Intellectual Property Office, the entire disclosure of which is incorporated herein by reference for all purposes.

BACKGROUND

1. Field

The following description relates to an imaging lens system which may implement constant optical performance regardless of changes in temperature of an ambient environment.

2. Description of Related Art

A small-sized surveillance camera may be configured to obtain image information of a surveillance area. For example, a small-sized surveillance camera may be mounted on a front bumper or a rear bumper of a vehicle and may provide an obtained image screen to a driver.

As an initially developed small-sized surveillance camera has been configured to image an obstacle near a vehicle, such a small-sized surveillance may have relatively low resolution, and resolution may change greatly according to temperature changes between −40 to 80° C. However, as there has been demand for an autonomous driving function of a vehicle, it has been necessary to develop a surveillance camera which may have high resolution and may implement constant optical properties even under harsh temperature conditions.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An imaging lens system which may implement constant optical performance regardless of ambient temperature.

In one general aspect, an imaging lens system includes a first lens, a second lens, a third lens having negative refractive power, a fourth lens, a fifth lens, and a sixth lens, disposed in order from an object side in a direction of an imaging plane, wherein one or more of the first to sixth lenses has a refractive index of 1.8 or greater, and has a refractive index temperature coefficient ($10^{-6}$/° C.) of 3 or greater.

The imaging lens system may include a seventh lens disposed between the sixth lens and the imaging plane.

The imaging lens system may include a stop disposed between the fourth lens and the fifth lens.

One or more of the first lens to the fourth lens may have a refractive index of 1.7 or greater.

One or more of the fifth lens and the sixth lens may have a refractive index of 1.8 or greater.

The sixth lens may have a refractive index temperature coefficient ($10^{-6}$/° C.) of 3 or greater.

One or more of the first lens to the sixth lens may have a refractive index of 1.7 or greater and a refractive index temperature coefficient ($10^{-6}$/° C.) of lower than 0.

The fourth lens may have a refractive index temperature coefficient ($10^{-6}$/° C.) of lower than 0.

Two or more of the first lens to the fourth lens may have negative refractive power.

In another general aspect, an imaging lens system includes a first focus correction lens having a refractive index of 1.7 or greater and a refractive index temperature coefficient ($10^{-6}$/° C.) of lower than 0; and a second focus correction lens having a refractive index of 1.8 or greater and a refractive index temperature coefficient ($10^{-6}$/° C.) of 3 or greater. The first focus correction lens has a convex object-side surface.

The imaging lens system may include a stop disposed between the first focus correction lens and the second focus correction lens.

The first focus correction lens may have positive refractive power.

The first focus correction lens may have a convex image-side surface.

The second focus correction lens may have negative refractive power.

The imaging lens system may include a rear lens disposed between the second focus correction lens and an imaging plane and having positive refractive power.

The rear lens may have a convex object-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
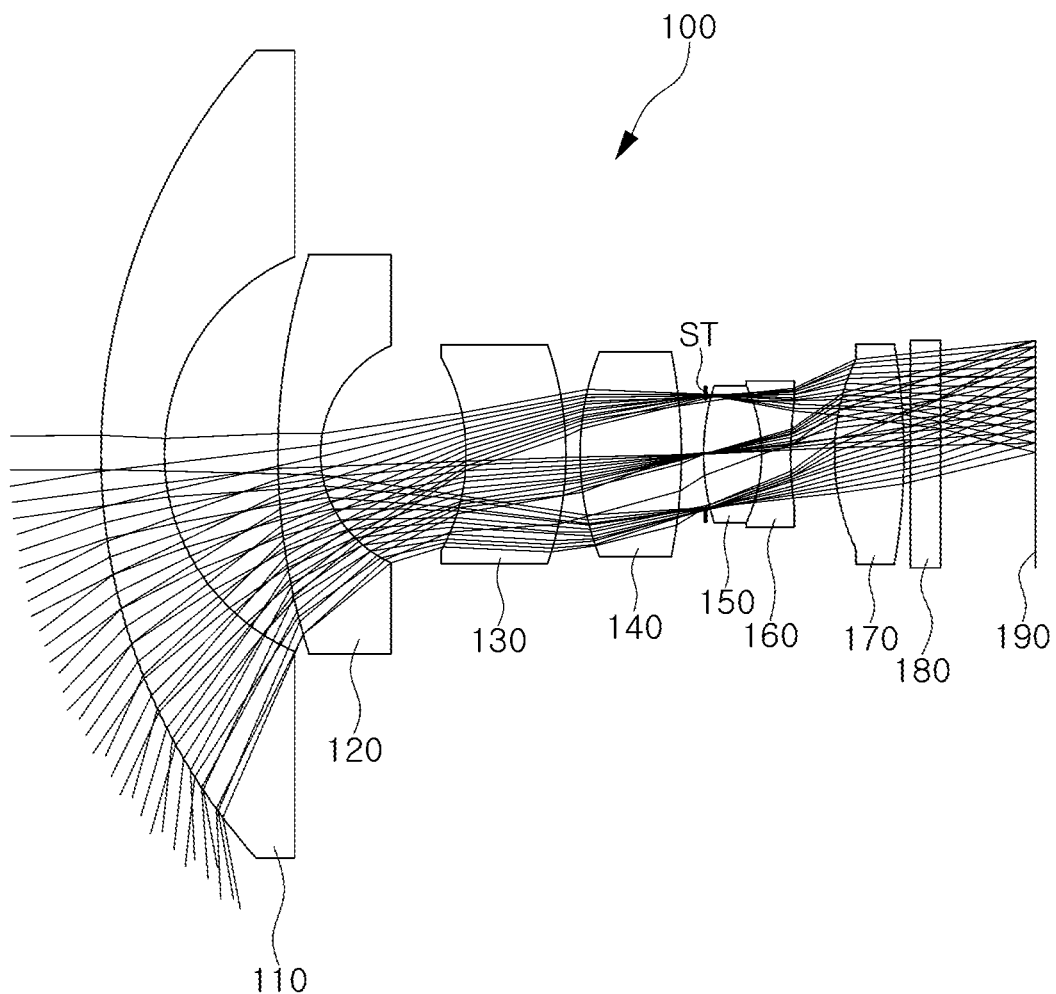
FIG. 1 is a diagram illustrating a first example of an imaging lens system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the examples, a first lens refers to a lens most adjacent to an object (or a subject), and a seventh lens refers to a lens most adjacent to an imaging plane (or an image sensor). In the examples, a unit of a radius of curvature, a thickness, a TTL (a distance from an object-side surface of the first lens to an imaging plane), a 2IMGHT (a diagonal length of an imaging plane), and a focal length are indicated in millimeters (mm).

A thickness of a lens, a gap between lenses, and a TTL refer to a distance of a lens along an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

The imaging lens system in the examples may include a plurality of lenses. For example, the imaging lens system may include a first lens, a second lens, a third lens, a fourth lens, a fifth lens, a sixth lens, and a seventh lens, disposed in order from an object side.

The first lens may have refractive power. One surface of the first lens may be convex. For example, the first lens may have a convex object-side surface. The first lens may include a spherical surface. For example, both surfaces of the first lens may be spherical. The first lens may be formed of a material having high light transmissivity and excellent workability. For example, the first lens may be manufactured using a glass or a plastic material. The first lens may have a predetermined refractive index. For example, a refractive index of the first lens may be 1.7 or greater. The first lens may have a predetermined Abbe number. For example, an Abbe number of the first lens may be 45 or greater.

The second lens may have refractive power. One surface of the second lens may be convex. For example, the second lens may have a convex object-side surface. The second lens may include a spherical surface. For example, both surfaces of the second lens may be spherical. The second lens may be formed of a material having high light transmissivity and excellent workability. For example, the second lens may be manufactured using a glass or plastic material. The second lens may have a predetermined refractive index. For example, a refractive index of the second lens may be 1.7 or greater. The second lens may have a predetermined Abbe number. For example, an Abbe number of the second lens may be 40 or greater.

The third lens may have refractive power. For example, the third lens may have negative refractive power. One surface of the third lens may be concave. For example, the third lens may have a concave object-side surface. The third lens may include a spherical surface. For example, both surfaces of the third lens may be spherical. The third lens may be formed of a material having high light transmissivity and excellent workability. For example, the third lens may be manufactured using a glass or plastic material. The third lens may have a predetermined refractive index. For example, a refractive index of the third lens may be lower than 1.65. The third lens may have the highest Abbe number. For example, an Abbe number of the third lens may be 60 or greater.

The fourth lens may have refractive power. One surface of the fourth lens may be convex. For example, the fourth lens may have a convex image-side surface. The fourth lens may include a spherical surface. For example, both surfaces of the fourth lens may be spherical. The fourth lens may be formed of a material having high light transmissivity and excellent workability. For example, the fourth lens may be manufactured using a glass or plastic material. The fourth lens may have a predetermined refractive index. For example, a refractive index of the fourth lens may be 1.7 or greater. The fourth lens may have a predetermined Abbe number. For example, an Abbe number of the fourth lens may be lower than 30.

The fifth lens may have refractive power. One surface of the fifth lens may be convex. For example, the fifth lens may have a convex object-side surface. The fifth lens may include a spherical surface. For example, both surfaces of the fifth lens may be spherical. The fifth lens may be formed of a material having high light transmissivity and excellent workability. For example, the fifth lens may be manufactured using a glass or plastic material. The fifth lens may have a predetermined refractive index. For example, a refractive index of the fifth lens may be 1.7 or greater. The fifth lens may have a predetermined Abbe number. For example, an Abbe number of the fifth lens may be 40 or greater.

The sixth lens may have refractive power. One surface of the sixth lens may be concave. For example, the sixth lens may have a concave object-side surface. The sixth lens may have a spherical surface. For example, both surfaces of the fifth lens may be spherical. The sixth lens may be formed of a material having high light transmissivity and excellent workability. For example, the fifth lens may be manufactured using a glass or plastic material. The sixth lens may have the highest refractive index among the first to seventh lenses. For example, a refractive index of the sixth lens may be 1.8 or greater. The sixth lens may have the lowest Abbe number among the first to seventh lenses. For example, an Abbe number of the sixth lens may be lower than 20.

One or more of the first to sixth lenses included in the imaging lens system may have a refractive index of 1.8 or greater and a refractive index temperature coefficient ($10^{-6}/°$ C.) of 3 or greater.

Two or more of the first to fourth lenses included in the imaging lens system may have negative refractive power. For example, the first and second lenses may have negative refractive power. As another example, each of the first to third lenses may have negative refractive power.

The imaging lens system may further include a stop. The stop may be disposed between the fourth lens and the fifth lens, and may adjust the amount of light incident to an imaging plane. One or more of the lenses disposed on an object side of the stop may have a refractive index of a considerable size. For example, at least one or more of the first to fourth lenses disposed on an object side of the stop may have a refractive index of 1.7 or greater. One or more of the lenses disposed on an image side of the stop may have a refractive index of a considerable size. For example, one or more of the fifth and sixth lenses disposed on an image side of the stop may have a refractive index of 1.8 or greater.

The imaging lens system may further include a seventh lens disposed on an image side of the sixth lens.

The seventh lens may have refractive power. One surface of the seventh lens may be convex. For example, the seventh lens may have a convex object-side surface. The seventh lens may include an aspherical surface. For example, both surfaces of the seventh lens may be aspherical. The aspherical surface of the seventh lens may be represented by Equation 1. The seventh lens may be formed of a material having high light transmissivity and excellent workability. For example, the seventh lens may be manufactured using a glass or plastic material. The seventh lens may have a predetermined refractive index. For example, a refractive index of the seventh lens may be 1.5 or greater. The seventh lens may have a predetermined Abbe number. For example, an Abbe number of the seventh lens may be 30 or greater.

$$Z = \frac{cr^2}{1+\sqrt{1-(1+k)c^2r^2}} + Ar^4 + Br^6 + Cr^8 + Dr^{10} \quad \text{Equation 1}$$

In Equation 1, "c" is an inverse of a radius of a curvature of a respective lens, "k" is a conic constant, "r" is a distance from a certain point on an aspherical surface of the lens to an optical axis, "A, B, C, and D" are aspheric constants, "Z" (or SAG) is a height from a certain point on an aspherical surface to an apex of the aspherical surface in an optical axis direction.

The imaging lens system in the examples may further include a plurality of focus correction lenses. Each of the focus correction lenses may have a refractive index of a considerable size and a refractive index temperature coefficient ($10^{-6}/°$ C.) of a considerable size. For example, the imaging lens system may include a first focus correction lens having a refractive index of 1.8 or greater and a refractive index temperature coefficient ($10^{-6}/°$ C.) of 3 or greater, and a second focus correction lens having a refractive index of 1.7 or greater and a refractive index temperature coefficient ($10^{-6}/°$ C.) of lower than 0.

The first focus correction lens may have positive refractive power. The first focus correction lens may have a convex object-side surface. The second focus correction lens may have negative refractive power. The second focus correction lens may have a convex object-side surface.

The imaging lens system in the examples may include a stop. The stop may be disposed between the first focus correction lens and the second focus correction lens. The imaging lens system may further include another lens. For example, the imaging lens system may include a rear lens disposed between the second focus correction lens and an imaging plane. The rear lens may have positive refractive power, and may have a convex object-side surface.

The imaging lens system may include a filter and an image sensor. The filter may be disposed between the lens disposed on the rear end and the image sensor. The filter may include a first filter and a second filter. The first filter may be configured to block light of some wavelengths, and the second filter may be configured to block penetration of foreign objects. The image sensor may be configured to convert an optical signal into an electrical signal. The image sensor may have a form of a charge-coupled device (CCD). The image sensor may form an imaging plane on which an image of the subject is formed.

The imaging lens system may satisfy one or more of the conditional expressions below:

DnDTL4<0[$10^{-6}/°$ C.]

3≤DnDTL6[$10^{-6}/°$ C.]

In the conditional expressions, "DnDTL4" is a refractive index temperature coefficient of the fourth lens, and "DnDTL6" is be a refractive index temperature coefficient of the sixth lens.

In the description below, various examples of the imaging lens system will be described.

A first example of the imaging lens system will be described with reference to FIG. 1.

The imaging lens system 100 may include a first lens 110, a second lens 120, a third lens 130, a fourth lens 140, a fifth lens 150, a sixth lens 160, and a seventh lens 170.

The first lens 110 may have negative refractive power, and may have a convex object-side surface and a concave image-side surface. The second lens 120 may have negative refractive power, and may have a convex object-side surface and a concave image-side surface. The third lens 130 may have negative refractive power, and may have a concave object-side surface and a convex image-side surface. The fourth lens 140 may have positive refractive power, and may have a convex object-side surface and a convex image-side surface. The fifth lens 150 may have positive refractive power, and may have a convex object-side surface and a convex image-side surface. The sixth lens 160 may have negative refractive power, and may have a concave object-side surface and a concave image-side surface. The seventh lens 170 may have positive refractive power, and may have a convex object-side surface and a convex image-side surface.

The imaging lens system 100 may include a pair of doublet lenses. For example, an image-side surface of the fifth lens 150 may be in contact with an object-side surface of the sixth lens 160.

The imaging lens system 100 may include a filter 180, an image sensor 190, and a stop ST. The filter 180 may be disposed between the seventh lens 170 and the image sensor 190. The stop ST may be disposed between the fourth lens 140 and the fifth lens 150.

Figure 2:
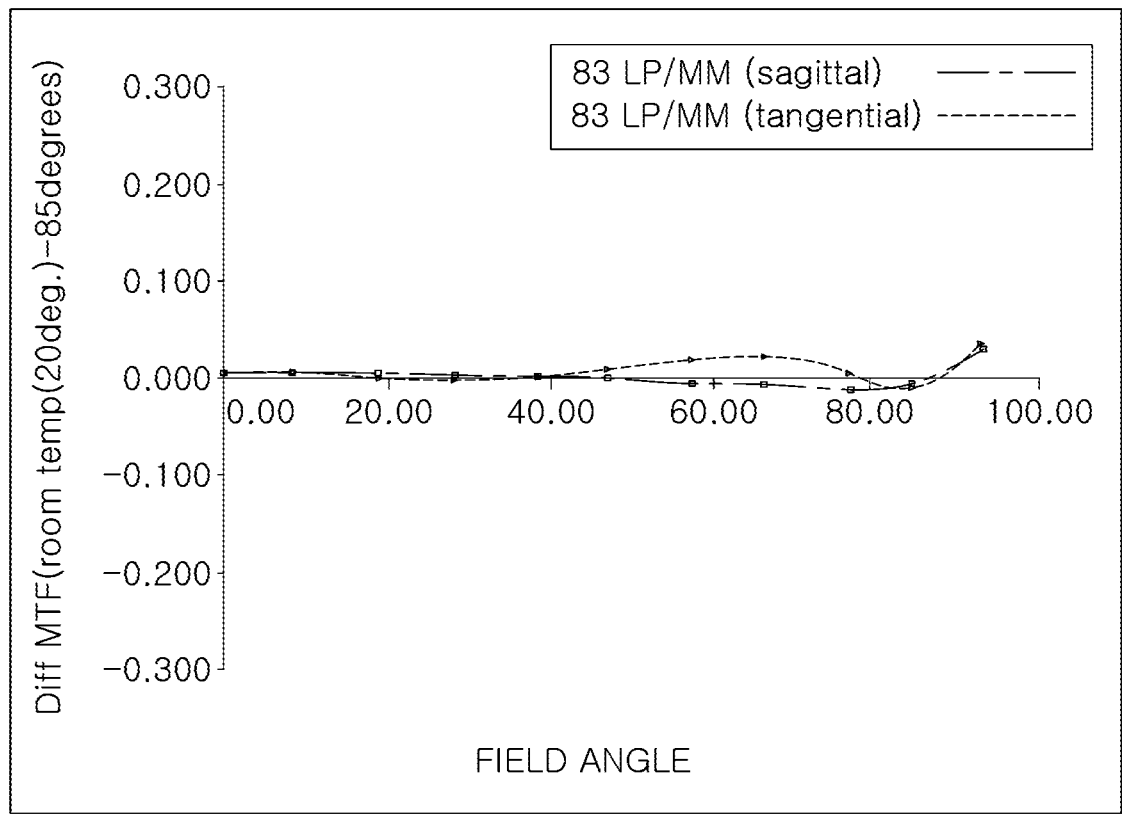
FIGS. 2 and 3 are MTF curves of the imaging lens system illustrated in FIG. 1.
Figure 3:
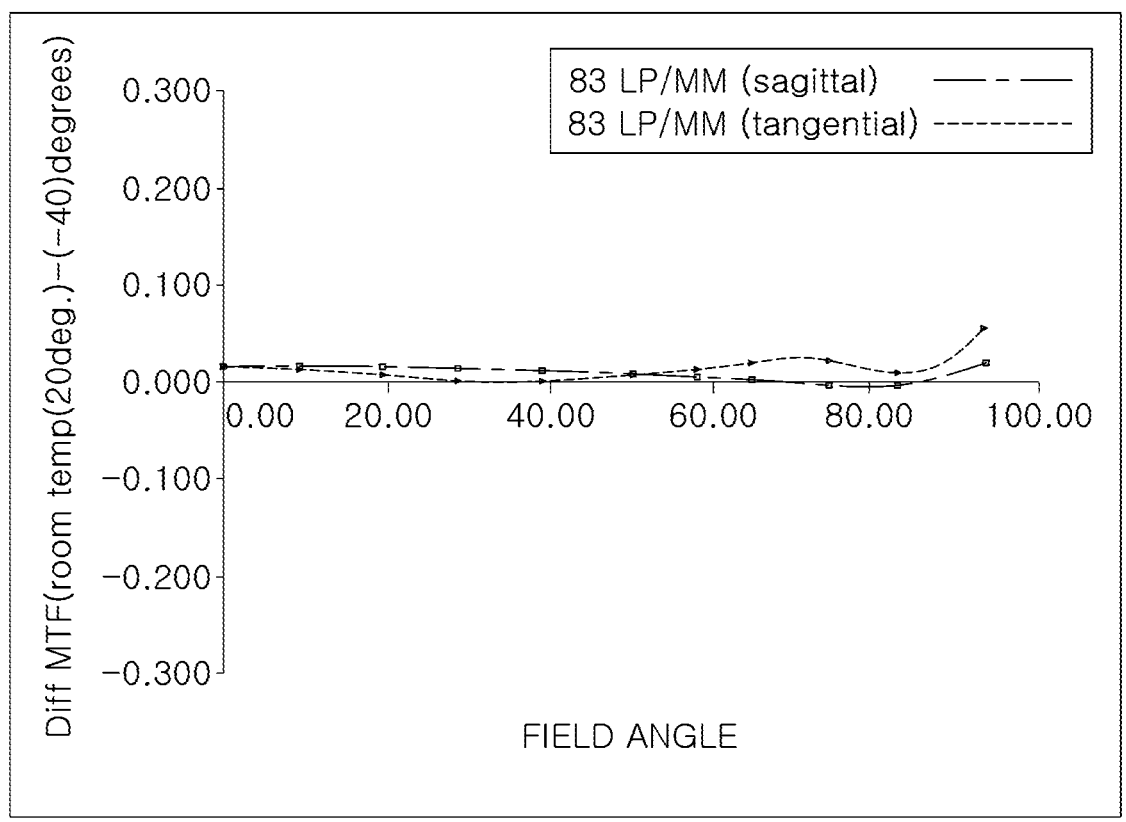

FIGS. 2 and 3 show aberration properties and MTF properties of the imaging lens system 100. The imaging lens system may exhibit constant optical properties in a section of a room temperature (20° C.) to a high temperature (85° C.) and in a section of a room temperature to a low temperature (−40° C.).

Tables 1 and 2 list lenses characteristics and aspherical values of the imaging lens system.

Figure 4:
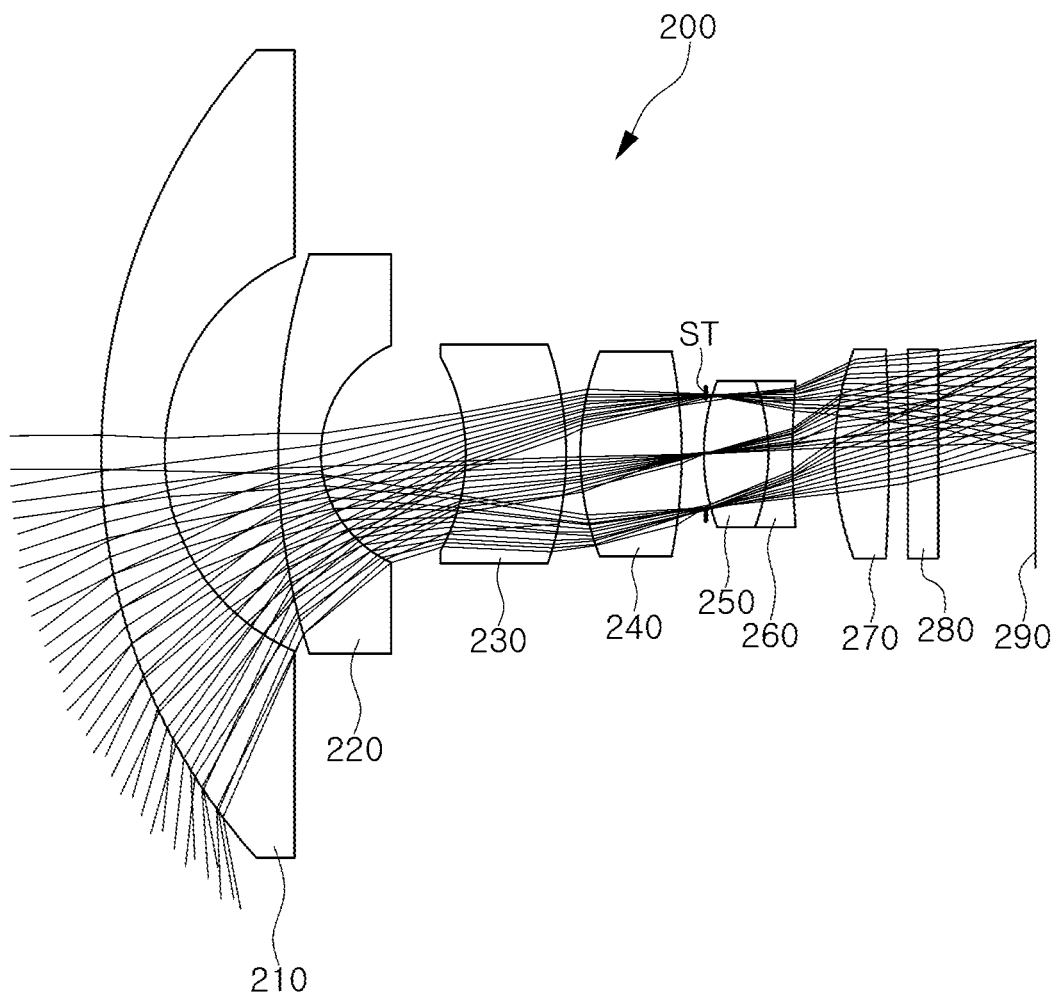
FIG. 4 is a diagram illustrating a second example of an imaging lens system.

A second example of the imaging lens system will be described with reference to FIG. 4.

The imaging lens system 200 may include a first lens 210, a second lens 220, a third lens 230, a fourth lens 240, a fifth lens 250, a sixth lens 260, and a seventh lens 270.

The first lens 210 may have negative refractive power, and may have a convex object-side surface and a concave image-side surface. The second lens 220 may have negative refractive power, and may have a convex object-side surface and a concave image-side surface. The third lens 230 may have negative refractive power, and may have a concave object-side surface and a convex image-side surface. The fourth lens 240 may have positive refractive power, and may have a convex object-side surface and a convex image-side surface. The fifth lens 250 may have positive refractive power, and may have a convex object-side surface and a convex image-side surface. The sixth lens 260 may have negative refractive power, and may have a concave object-side surface and a concave image-side surface. The seventh lens 270 may have positive refractive power, and may have a convex object-side surface and a convex image-side surface.

The imaging lens system 200 may include a pair of doublet lenses. For example, an image-side surface of the fifth lens 250 may be in contact with an object-side surface of the sixth lens 260.

The imaging lens system 200 may include a filter 280, an image sensor 290, and a stop ST. The filter 280 may be disposed between the seventh lens 270 and the image sensor 290. The filter 280 may be configured to block light of a certain wavelength. The stop ST may be disposed between the fourth lens 240 and the fifth lens 250.

Tables 3 and 4 list lenses characteristics and aspherical values of the imaging lens system 200.

TABLE 2

| Surface No. | K | A | B | C |
|---|---|---|---|---|
| S14 | −0.690747 | −0.00194790 | 0.00025400 | −0.00003130 |
| S15 | −66.635719 | −0.00208870 | 0.00069220 | −0.00005230 |

TABLE 1

| Surface No. | Note | Radius of Curvature | Thickness/ Distance | Effective Radius | Refractive Index | Abbe Number | DnDt |
|---|---|---|---|---|---|---|---|
| S1 | First | 16.530 | 1.650 | 9.880 | 1.773 | 50.0 | |
| S2 | Lens | 5.813 | 3.078 | 5.340 | | | |
| S3 | Second | 18.500 | 1.079 | 4.910 | 1.744 | 45.0 | |
| S4 | Lens | 3.233 | 3.928 | 2.950 | | | |
| S5 | Third | −5.496 | 2.700 | 2.580 | 1.593 | 69.0 | |
| S6 | Lens | −8.819 | 0.348 | 2.680 | | | |
| S7 | Fourth | 6.653 | 2.700 | 2.510 | 1.808 | 23.0 | −4.80 |
| S8 | Lens | −19.000 | 0.644 | 1.980 | | | |
| S9 | Stop | infinity | 0.000 | 1.520 | | | |
| S10 | Fifth | 6.319 | 1.617 | 1.600 | 1.744 | 45.0 | |
| S11 | Lens | −3.952 | 0.000 | 1.630 | | | |
| S12 | Sixth | −3.952 | 0.700 | 1.630 | 1.986 | 16.0 | 5.50 |
| S13 | Lens | 10.239 | 1.226 | 1.780 | | | |
| S14 | Seventh | 5.267 | 1.828 | 2.530 | 1.583 | 59.0 | |
| S15 | Lens | −11.497 | 0.209 | 2.680 | | | |
| S16 | Filter | infinity | 0.800 | 2.700 | 1.517 | 64.0 | |
| S17 | | infinity | 2.000 | 2.740 | | | |
| S18 | Imaging Plane | infinity | 0.876 | 3.010 | | | |

TABLE 3

| Surface No. | Note | Radius of Curvature | Thickness/Distance | Effective Radius | Refractive Index | Abbe Number | DnDt |
|---|---|---|---|---|---|---|---|
| S1 | First | 18.509 | 0.901 | 7.240 | 1.773 | 49.6 | |
| S2 | Lens | 4.710 | 2.579 | 4.250 | | | |
| S3 | Second | 21.005 | 0.750 | 3.950 | 1.744 | 44.9 | |
| S4 | Lens | 3.483 | 2.901 | 2.850 | | | |
| S5 | Third | −5.561 | 2.137 | 2.740 | 1.487 | 70.4 | |
| S6 | Lens | −8.948 | 0.200 | 2.940 | | | |
| S7 | Fourth | 6.861 | 2.700 | 2.890 | 1.808 | 22.8 | −4.80 |
| S8 | Lens | −40.197 | 1.920 | 2.430 | | | |
| S9 | Stop | infinity | 0.100 | 1.410 | | | |
| S10 | Fifth | 5.956 | 1.727 | 1.550 | 1.744 | 44.9 | |
| S11 | Lens | −3.807 | 0.000 | 1.660 | | | |
| S12 | Sixth | −3.807 | 0.700 | 1.660 | 1.986 | 16.5 | 5.50 |
| S13 | Lens | 62.535 | 1.743 | 1.820 | | | |
| S14 | Seventh | 6.301 | 1.497 | 2.560 | 1.751 | 32.8 | |
| S15 | Lens | −176.789 | 0.209 | 2.610 | | | |
| S16 | Filter | infinity | 0.800 | 2.650 | 1.517 | 64.2 | |
| S17 | | infinity | 2.737 | 2.650 | | | |
| S18 | Imaging Plane | infinity | 0.000 | 2.650 | | | |

TABLE 4

| Surface No. | K | A | B | C | D |
|---|---|---|---|---|---|
| S14 | −8.804000 | 0.00193800 | −0.00018070 | 0.00000149 | 0.00000000 |
| S15 | −99.000000 | 0.00000000 | 0.00000000 | 0.00000000 | 0.00000000 |

Figure 5:
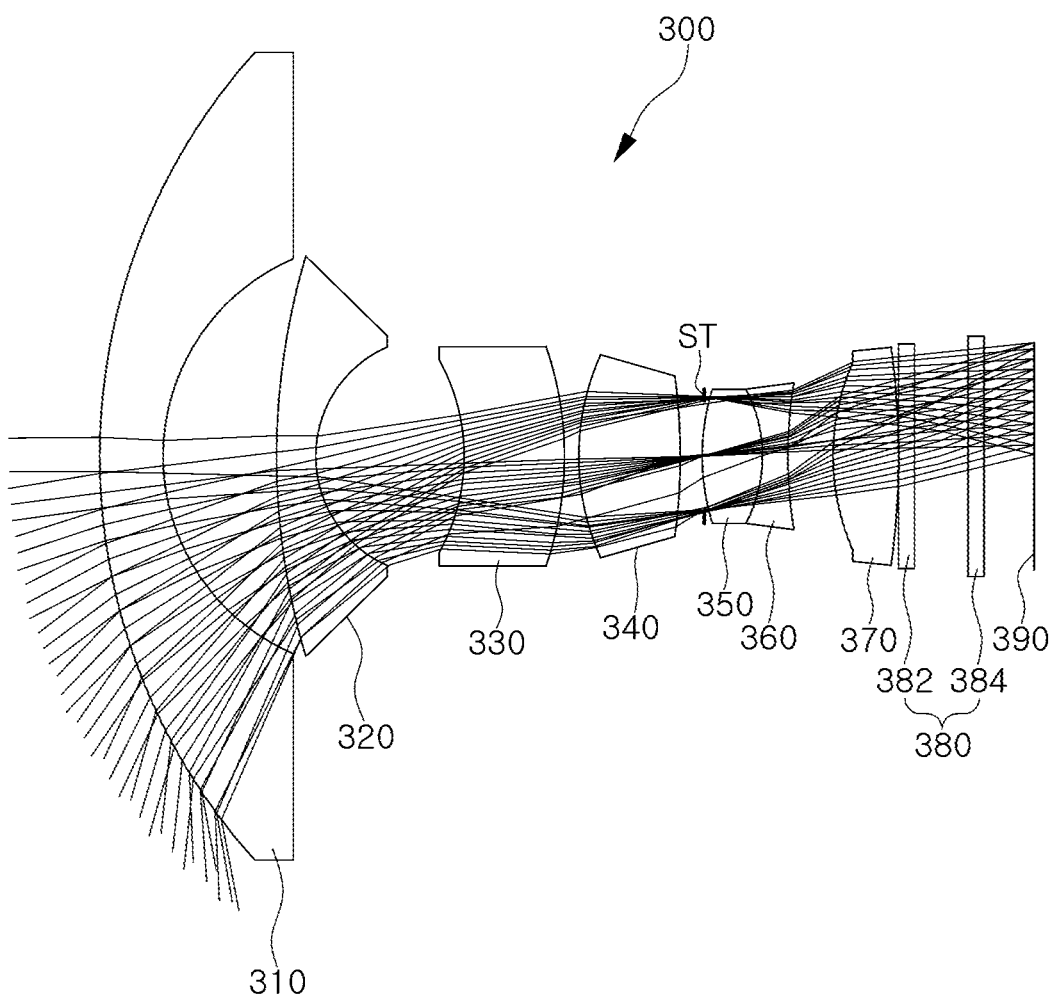
FIG. 5 is a diagram illustrating a third example of an imaging lens system.

A third example of the imaging lens system will be described with reference to FIG. 5.

The imaging lens system 300 may include a first lens 310, a second lens 320, a third lens 330, a fourth lens 340, a fifth lens 350, a sixth lens 360, and a seventh lens 370.

The first lens 310 may have negative refractive power, and may have a convex object-side surface and a concave image-side surface. The second lens 320 may have negative refractive power, and may have a convex object-side surface and a concave image-side surface. The third lens 330 may have negative refractive power, and may have a concave object-side surface and a convex image-side surface. The fourth lens 340 may have positive refractive power, and may have a convex object-side surface and a convex image-side surface. The fifth lens 350 may have positive refractive power, and may have a convex object-side surface and a convex image-side surface. The sixth lens 360 may have negative refractive power, and may have a concave object-side surface and a concave image-side surface. The seventh lens 370 may have positive refractive power, and may have a convex object-side surface and a convex image-side surface.

The imaging lens system 300 may include a pair of doublet lenses. For example, an image-side surface of the fifth lens 350 may be in contact with an object-side surface of the sixth lens 360.

The imaging lens system 300 may include a filter 380, an image sensor 390, and a stop ST. The filter 380 may be disposed between the seventh lens 370 and the image sensor 390. The filter 380 may include a first filter 382 and a second filter 384. The first filter 382 may be configured to block light of a certain wavelength, and the second filter 384 may be configured to prevent contamination of the image sensor 390 caused by foreign objects. The stop ST is disposed between the fourth lens 340 and the fifth lens 350.

Tables 5 and 6 list lenses characteristics and aspherical values of the imaging lens system 300.

TABLE 5

| Surface No. | Note | Radius of Curvature | Thickness/Distance | Effective Radius | Refractive Index | Abbe Number | DnDt |
|---|---|---|---|---|---|---|---|
| S1 | First | 16.530 | 1.650 | 9.850 | 1.773 | 50.0 | |
| S2 | Lens | 5.812 | 3.116 | 5.350 | | | |
| S3 | Second | 19.600 | 1.057 | 4.890 | 1.744 | 45.0 | |
| S4 | Lens | 3.274 | 4.051 | 2.970 | | | |
| S5 | Third | −5.482 | 2.700 | 2.560 | 1.593 | 69.0 | |
| S6 | Lens | −8.819 | 0.204 | 2.660 | | | |
| S7 | Fourth | 6.653 | 2.700 | 2.510 | 1.808 | 23.0 | −4.80 |
| S8 | Lens | −19.000 | 0.607 | 1.980 | | | |
| S9 | Stop | infinity | 0.000 | 1.530 | | | |
| S10 | Fifth | 6.319 | 1.617 | 1.630 | 1.744 | 45.0 | |
| S11 | Lens | −3.952 | 0.000 | 1.670 | | | |
| S12 | Sixth | −3.952 | 0.700 | 1.670 | 1.986 | 16.0 | 5.50 |
| S13 | Lens | 10.239 | 1.251 | 1.800 | | | |

TABLE 5-continued

| Surface No. | Note | Radius of Curvature | Thickness/ Distance | Effective Radius | Refractive Index | Abbe Number | DnDt |
|---|---|---|---|---|---|---|---|
| S14 | Seventh | 5.267 | 1.828 | 2.580 | 1.583 | 59.0 | |
| S15 | Lens | −11.497 | −0.087 | 2.700 | | | |
| S16 | First | infinity | 0.400 | 2.710 | 1.517 | 64.0 | |
| S17 | Filter | infinity | 1.500 | 2.740 | | | |
| S18 | Second | infinity | 0.400 | 2.910 | 1.517 | 64.0 | |
| S19 | Filter | infinity | 1.290 | 2.940 | | | |
| S20 | Imaging Plane | infinity | 0.005 | 3.110 | | | |

TABLE 6

| Surface No. | K | A | B | C |
|---|---|---|---|---|
| S14 | −0.690747 | −0.0019479 | 0.000254 | −0.0000313 |
| S15 | −66.635719 | −0.0020887 | 0.0006922 | −0.0000523 |

Figure 6:
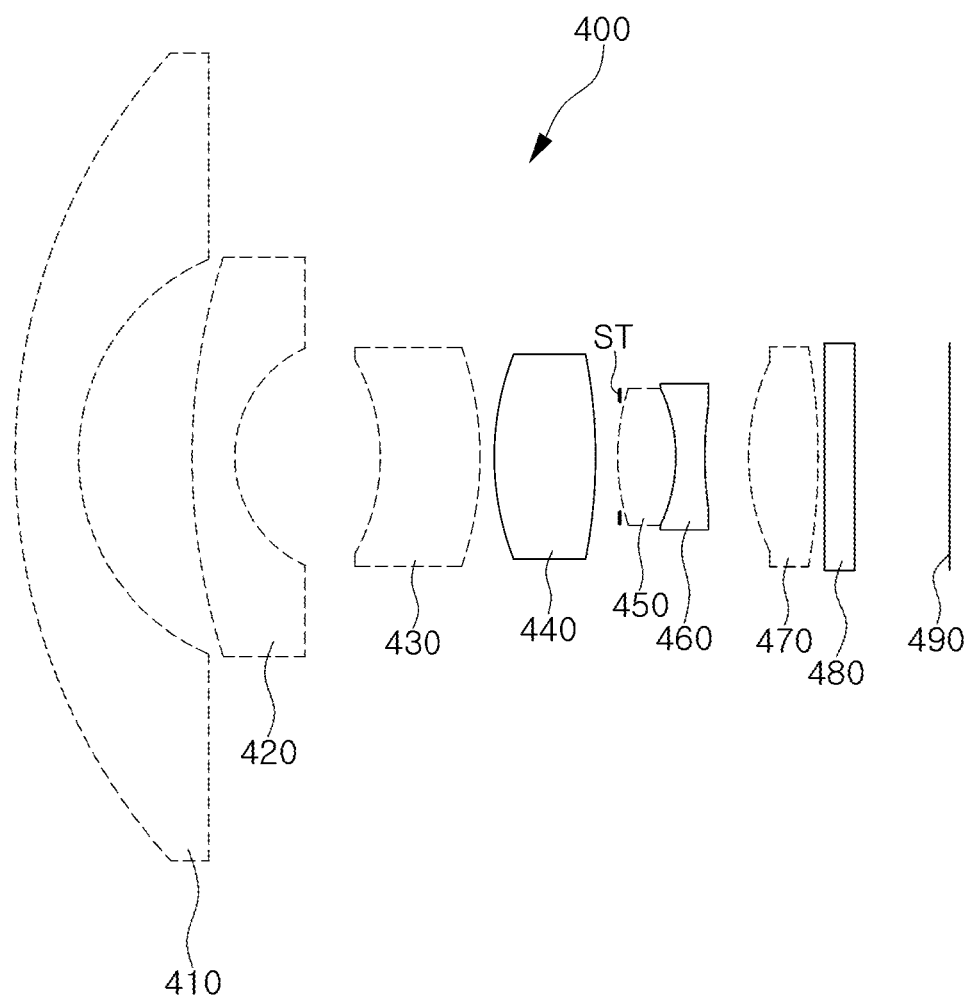
FIG. 6 is a diagram illustrating a fourth example of an imaging lens system.

A fourth example of the imaging lens system will be described with reference to FIG. 6.

The imaging lens system 400 may include a first focus correction lens 440 and a second focus correction lens 460. The first focus correction lens 440 may have positive refractive power. The first focus correction lens 440 may have a convex object-side surface and a convex image-side surface. The second focus correction lens 460 may have negative refractive power. The second focus correction lens 460 may have a concave object-side surface and a concave image-side surface.

The imaging lens system 400 may further include a lens having refractive power. For example, the imaging lens system 400 may include a rear lens 470 disposed between the second focus correction lens 460 and the imaging plane 490. The rear lens 470 may have positive refractive power, and may have a convex object-side surface and a convex image-side surface.

The imaging lens system 400 may further include a lens having refractive power. For example, the imaging lens system 400 may further include lenses 410, 420, and 430 disposed on an object side of the first focus correction lens 440. As another example, the imaging lens system 400 may further include a lens 450 disposed between the first focus correction lens 440 and the second focus correction lens 460. Each lens 410, 420, 430, and 450 may have a predetermined refractive power and a predetermined shape. However, the lenses 410, 420, 430, and 450 may not be necessarily provided. For example, some of the lenses 410, 420, and 430 disposed on a front side of the first focus correction lens 440 and the lens 450 disposed between the first focus correction lens 440 and the second focus correction lens 460 may be omitted.

The imaging lens system 400 may include a stop ST. The stop ST may be disposed between the first focus correction lens 440 and the second focus correction lens 460.

The imaging lens system of the examples may have optical properties as below. For example, a total length (TTL) of the imaging lens system may be within a range of 20-30 mm, a total focal length (f) may be within a range of 3.0-5.0 mm, a focal length (f1) of the first lens may be within a range of −5 to −7.0 mm, a focal length (f2) of the second lens may be within a range of −8.0 to −4.0 mm or less, a focal length (f3) of the third lens may be within a range of −50 to −30 mm, and a focal length (f4) of the fourth lens may be within a range of 5.0 to 9.0 mm, a focal length (f5) of the fifth lens may be within a range of 2.5 to 5.0 mm, a focal length (f6) of the sixth lens may be within a range of −5.0 to −2.0 mm, and a focal length (f7) of the seventh lens may be within a range of 5.0 to 10 mm.

Table 7 list optical properties of the imaging lens system of the first to third examples.

TABLE 7

| Note | First Example | Second Example | Third Example |
|---|---|---|---|
| TTL | 25.3850 | 23.6010 | 24.9892 |
| f1 | −12.4413 | −8.4177 | −12.4379 |
| f2 | −5.4293 | −5.7164 | −5.4330 |
| f3 | −35.2702 | −38.0244 | −34.9691 |
| f4 | 6.3988 | 7.4434 | 6.3988 |
| f5 | 3.5033 | 3.3764 | 3.5033 |
| f6 | −2.8224 | −3.6201 | −2.8224 |
| f7 | 6.4537 | 8.1351 | 6.4537 |

According to the aforementioned examples, an imaging lens system which may implement constant optical properties even in a high or low temperature environment may be provided.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a first lens having negative refractive power, a second lens having negative refractive power, a third lens having negative refractive power and a convex image-side surface, a fourth lens having positive refractive power, a fifth lens having positive refractive power and comprising a convex object-side surface in a paraxial region, and a sixth lens having negative refractive power, disposed in order from an object side toward an imaging plane, wherein an image-side surface of the fifth lens is in contact with an object-side surface of the sixth lens, wherein the sixth lens has a refractive index of 1.8 or greater, and has a refractive index temperature coefficient ($10^{-6}$/° C.) of 3 or greater, and wherein a thickness of the first lens along an optical axis is greater than a thickness of the fifth lens along the optical axis.

2. The imaging lens system of claim 1, further comprising:

a seventh lens disposed between the sixth lens and the imaging plane.

3. The imaging lens system of claim 1, further comprising:

a stop disposed between the fourth lens and the fifth lens.

4. The imaging lens system of claim 3, wherein one or more of the first lens to the fourth lens has a refractive index of 1.7 or greater.

5. The imaging lens system of claim 1, wherein one or more of the first lens to the sixth lens has a refractive index of 1.7 or greater and a refractive index temperature coefficient ($10^{-6}$/° C.) of lower than 0.

6. The imaging lens system of claim 5, wherein the fourth lens has a refractive index temperature coefficient ($10^{-6}$/° C.) of lower than 0.

* * * * *